(12) United States Patent
Lin

(10) Patent No.: US 6,542,087 B2
(45) Date of Patent: Apr. 1, 2003

(54) SYSTEM AND METHOD FOR EXTRACTING A POINT OF INTEREST OF AN OBJECT IN FRONT OF A COMPUTER CONTROLLABLE DISPLAY CAPTURED BY AN IMAGING DEVICE

(75) Inventor: I-Jong Lin, Redwood City, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/775,394

(22) Filed: Jan. 31, 2001

(65) Prior Publication Data

US 2002/0101364 A1 Aug. 1, 2002

(51) Int. Cl.[7] ............................................. G08G 1/123
(52) U.S. Cl. ...................... 340/988; 345/730; 345/158
(58) Field of Search .......................... 340/988; 345/730, 345/698, 158, 173, 179; 382/291, 313, 382

(56) References Cited

U.S. PATENT DOCUMENTS

| | | | | |
|---|---|---|---|---|
| 5,502,568 A | * | 3/1996 | Ogawa et al. .............. | 356/375 |
| 5,528,263 A | | 6/1996 | Platzker ...................... | 345/156 |
| 5,729,252 A | * | 3/1998 | Fraser ........................ | 345/302 |
| 6,281,878 B1 | * | 8/2001 | Montellese ................. | 345/156 |
| 6,289,126 B1 | * | 9/2001 | Ishisaka ...................... | 382/205 |
| 6,314,209 B1 | * | 11/2001 | Kweon et al. ............. | 382/243 |
| 6,353,428 B1 | * | 3/2002 | Maggioni et al. .......... | 345/157 |
| 6,392,665 B1 | * | 5/2002 | Argabright et al. ......... | 345/723 |

FOREIGN PATENT DOCUMENTS

EP           0947948 A      10/1999

OTHER PUBLICATIONS

Cormen T. H.; Leiserson C.E. ; Rivest R. L.: "Introduction to Algorithms" 1990, The Mit Press, Cambridege, London; pp. 301–302 and pp. 469–471.

* cited by examiner

Primary Examiner—John Tweel

(57) ABSTRACT

A system and method of identifying a point of interest of an object located in front of a computer controlled display area captured by an image capture device is performed by capturing an image of the display area within the capture area of the image capture device. Pixels within the captured data are identified that correspond to the object within the display area and to the peripheral boundary of the display area within the capture area. Pixels are identified and stored that correspond to the common subset of the object pixels and the peripheral boundary pixels. A search is performed using the common pixels and the object pixels to determine a pixel corresponding to the point of interest of the object in the display area within the capture area.

22 Claims, 6 Drawing Sheets

| ENTRY | PIXEL | N |
|---|---|---|
| 1 | B1 | 1 |
| 2 | B2 | 1 |
| 3 | B3 | 1 |
| 4 | 1 | 2 |
| 5 | 2 | 2 |
| 6 | 3 | 3 |
| 7 | 4 | 3 |
| 8 | 5 | 4 |
| 9 | 6 | 5 |
| 10 | 7 | 6 |
| 11 | 8 | 6 |
| 12 | 9 | 7 |

Fig. 6

SYSTEM AND METHOD FOR EXTRACTING A POINT OF INTEREST OF AN OBJECT IN FRONT OF A COMPUTER CONTROLLABLE DISPLAY CAPTURED BY AN IMAGING DEVICE

FIELD OF THE INVENTION

The present invention relates to a computer controllable display system and in particular to the interaction of a user with a computer controlled displayed image.

BACKGROUND OF THE INVENTION

Computer controlled projection systems generally include a computer system for generating image data and a projector for projecting the image data onto a projection screen. Typically, the computer controlled projection system is used to allow a presenter to project presentations that were created with the computer system onto a larger screen so that more than one viewer can easily see the presentation. Often, the presenter interacts with the projected image by pointing to notable areas on the projected image with his/her finger, laser pointer, or some other pointing device or instrument.

The problem with this type of system is that if a user wants to cause any change to the projected image he/she must interact with the computer system (not the projected image) using an input device such as a mouse, keyboard or remote device. For instance, a device is often employed by a presenter to remotely control the computer system via infrared signals to display the next slide in a presentation. However, this can be distracting to the viewers of the presentation since the presenter is no longer interacting with them and the projected presentation and, instead, is interacting with the computer system. Often, this interaction can lead to significant interruptions in the presentation.

Hence, a variation of the above system has been developed to overcome the computer-only interaction problem to allow the presenter to directly interact with the projected image and thus give the presenter better interaction with the audience. In this system, the computer generates image data (e.g. presentation slides) to be projected onto a projection screen with an image projector. The system also includes a digital image capture device such as a digital camera for capturing the projected image. The captured projected image data is transmitted back to the computing system and is used to determine the location of any objects (e.g., pointing device) in front of the screen. The computer system may then be controlled dependent on the determined location of the pointing device. For instance, in U.S. Pat. No. 5,138,304 assigned to the assignee of the subject application, a light beam is projected onto the screen and is detected by a camera. To determine the position of the light beam, the captured image data of the projected image and the original image data are compared to determine the pointer position. The computer is then caused to position a cursor in the video image at the pointer position or is caused to modify the projected image data in response to the pointer position.

In order to implement a user interactive, computer controlled display or projection system, it is necessary to first identify the location of the displayed or projected image within the captured image data and then analyze the captured data corresponding to the displayed or projected image to identify and locate objects in front of the image. The object location information can then be used by the computer system to respond to the location of the objects to modify the displayed or projected image as desired by the presenter.

In this type of system, it is also desirable for the system to additionally be able to identify and locate the point of interest of the object. For instance, the point of interest of the pointer would be the tip of a pointer or the tip of a presenter's finger. Hence, the presenter can then accurately point to a specific location within the displayed image so as to cause the system to respond dependent on that specific location of the point of interest.

Previously, the identification and location of the point of interest of an object in front of the display has been achieved by performing a detailed image analysis of the captured image data requiring exhaustive mathematical manipulations.

Hence, what is needed is a technique of locating the point of interest of an object located in front of a displayed or projected image in a user interactive, computer controlled display system simple enough to be performed during real-time operation.

SUMMARY OF THE INVENTION

A system and method of identifying a point of interest of an object located in front of a computer controlled display area captured by an image capture device is described. In accordance with the system and method, the point of interest of an object that extends into the captured display area is the point of the object that is the furthest distance from the peripheral boundary of the display area that has the shortest path of adjacent pixels of the captured display area data to the boundary.

One embodiment of the method is performed by capturing an image of the display area to obtain captured data, identifying pixels within the captured data that correspond to the object within the captured data, identifying pixels within the captured data that correspond to the peripheral boundary of the display area within the captured data, identifying and storing a subset of pixels common to the object pixels and the peripheral boundary pixels, and then performing a search using the common pixels and the object pixels to locate a pixel corresponding to the point of interest of the object. In one embodiment, the search is performed using a breadth-first search algorithm.

One embodiment of the system for identifying a point of interest of an object located in front of a computer controlled display area captured by an image capture device includes a computing system for displaying at least one image in a display area in response to image data, an image capture device for capturing image data including the display area within a capture area, means for identifying pixels in the captured data corresponding to the object in the display area, means for identifying pixels in the captured data corresponding to the peripheral boundary of the display area, means for identifying and storing the subset of pixels common to the object pixels and the boundary pixels, and means for searching the common pixels and the object pixels to determine a pixel corresponding to the point of interest of the object in the display area. In one embodiment, the means for searching comprises a breadth-first searching algorithm implementable in one of software, hardware or a combination of software and hardware.

BRIEF DESCRIPTION OF THE DRAWINGS

The objects, features, and advantages of the present invention will be apparent to one skilled in the art, in view of the following detailed descriptions in which:

FIG. 6 illustrates an exemplary FIFO created when performing a breadth-first searching algorithm on the array shown in FIG. 4.

DETAILED DESCRIPTION OF THE INVENTION

A system and method of identifying a point of interest of an object located in front of a computer controlled display area captured by an image capture device. In accordance with the system and method, the point of interest of an object that extends into the captured display area is the point of the object that is the furthest distance from the peripheral boundary of the display area that has the shortest path of adjacent pixels to the boundary. Defining the point of interest in this manner facilitates the use of a simple, low computational searching algorithm for locating the point of interest of the object, thereby providing a system and method applicable to real-time display presentations.

Figure 1:
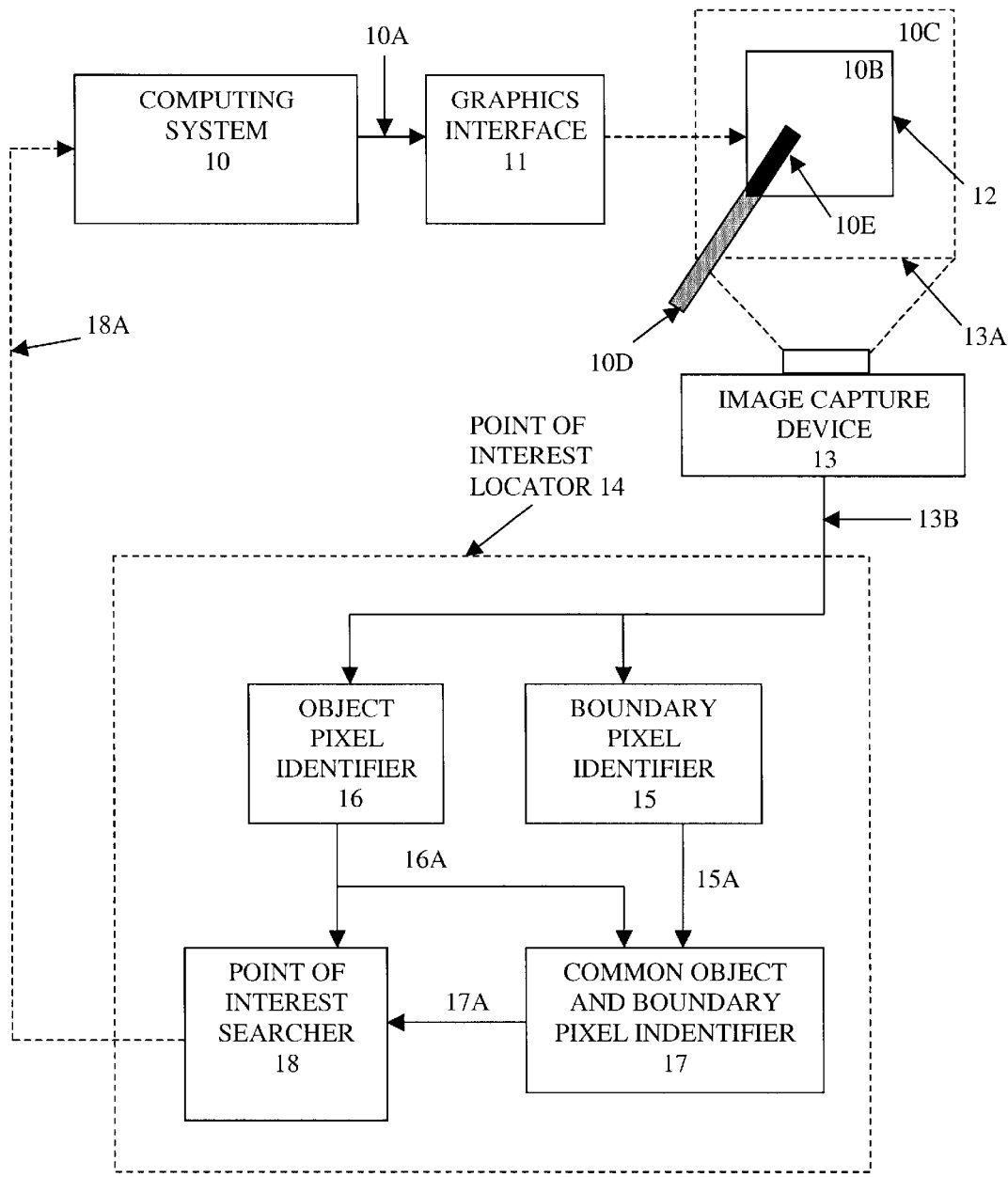
FIG. 1 illustrates a first embodiment of the system for identifying a point of interest of an object located in front of a computer controlled display area captured by an image capture device in accordance with the present invention.

One embodiment of the system of identifying a point of interest of an object is shown in a block diagram (FIG. 1) including a computing system 10 for generating image data 10A and a graphical interface 11 for causing images 10B corresponding to the image data 10A to be displayed in display area 12. It should be understood that the graphical interface may be a portion of the computing system or may be a distinct element external to the computing system. The system further includes an image capture device 13 having an associated image capture area 13A for capturing displayed images 10B. The captured images also include images 10C of objects or regions that are outside of the display area 10B. The captured images can also include objects 10D that are positioned within the image capture area 13A in front of the display area 12. The captured images are converted into digital image data 13B and are transmitted to a Point of Interest locator 14. Point of Interest locator 14 includes a Boundary Pixel Identifier 15, an Object Pixel Identifier 16, a Common Object and Boundary Pixel Identifier 17, and a Point of Interest Searcher 18.

The Boundary Pixel Identifier 15 receives captured image data 13B and identifies the subset of pixels 15A in data 13B corresponding to the peripheral boundary of the display area 12. According to one embodiment of the present invention, peripheral boundary pixels are determined using the system and method as described in U.S. application Ser. No. 09/774,452 (Attorney Docket No. 10007846) incorporated herein by reference. In accordance with this technique, the peripheral boundary of the display area is identified by deriving constructive and destructive feedback data from image data corresponding to a plurality of displayed and captured images. In one embodiment, Boundary Pixel Identifier 15 is used during the calibration of the system shown in FIG. 1 prior to real-time presentation use.

The Object Pixel Identifier 16 receives captured image data 13B and identifies the subset of pixels 16A in data 13B corresponding to the portion of the object 10E (darkened portion of object 10D) that is positioned in the foreground of the display area 12. According to one embodiment of the present invention, object pixels are determined using the system and method as described in U.S. application Ser. No. 09/775,032 (Attorney Docket No. 10007845) incorporated herein by reference. In accordance with this technique, the object pixels are identified by initially calibrating the system to obtain a coordinate location mapping function and an intensity mapping function between the display area and the captured display area in the capture area of an image capture device. Once calibrated, objects can be located during real-time system operation by a) converting display area image data using the mapping functions to obtain expected captured display area data, b) capturing the display area image to obtain actual captured display area data, and c) comparing the expected and actual data to determine the location of objects in front of the display area in the capture area, thereby identifying pixels in the captured image data 13B corresponding to the objects.

The Common Object and Boundary Pixel Identifier 17 identifies a subset of pixels 17A that is common to both of the object and boundary pixels (i.e., subsets 15A and 16A). One manner in which this identification is performed is by comparing the subset of object pixels 16A to the subset of boundary pixels 15A on a pixel-by-pixel basis. Once subset 17 is identified it is stored in a First In/First Out storage area (FIFO), not shown. It should be understood that the FIFO can be a storage area in one of the Point of Interest Searcher 18, a portion of the computing system 10, or an external memory unit.

The Point of Interest Searcher 18 searches using the stored subset of pixels 17A and the subset of object pixels 16A to determine the object pixel value corresponding to the point of interest of the object. In one embodiment, the Searcher 18 includes a breadth-first search unit for searching the subset of object pixels 16A using the stored subset 17A. The point of interest location information 18A can be transmitted to the computing system 10 for use in the user interactive, computer controlled display system.

In this embodiment, the computing system 10 includes at least a central processing unit (CPU) and a memory for storing digital data (e.g., image data) and has the capability of generating at least three levels of grayscale images. The display area can be a computer monitor driven by the graphical interface or can be an area on a projection screen or projection area (e.g., a wall). In the case in which images are displayed using projection, the system includes an image projector (not shown in FIG. 1) that is responsive to image data provided from the graphical interface.

In one embodiment, the image capture device is a digital still or video camera arranged so as to capture at least all of the images 10B displayed in the display area 12 within a known time delay. It is well known in the field of digital image capture that an image is captured by a digital camera using an array of sensors that detect the intensity of the light impinging on the sensors within the capture area of the camera. The light intensity signals are then converted into digital image data corresponding to the captured image. Hence, the captured image data 13B is digital image data corresponding to the captured image. In another embodiment the image capture device is an analog still or video camera and captured analog image data is converted into captured digital image data 13B.

In one embodiment, the images 10B correspond to a plurality of slides in a user's computer generated slide presentation.

It should be understood that all or a portion of the functions of the Point of Interest locator 14 can be performed by the computing system. Consequently, although it is shown external to the computing system, all or portions of the Point of Interest locator 14 may be implemented within the computing system.

It should be further understood that the Point of Interest locator 14 can be implemented in a software implementation, hardware implementation, or any combination of software and hardware implementations.

Figure 2:
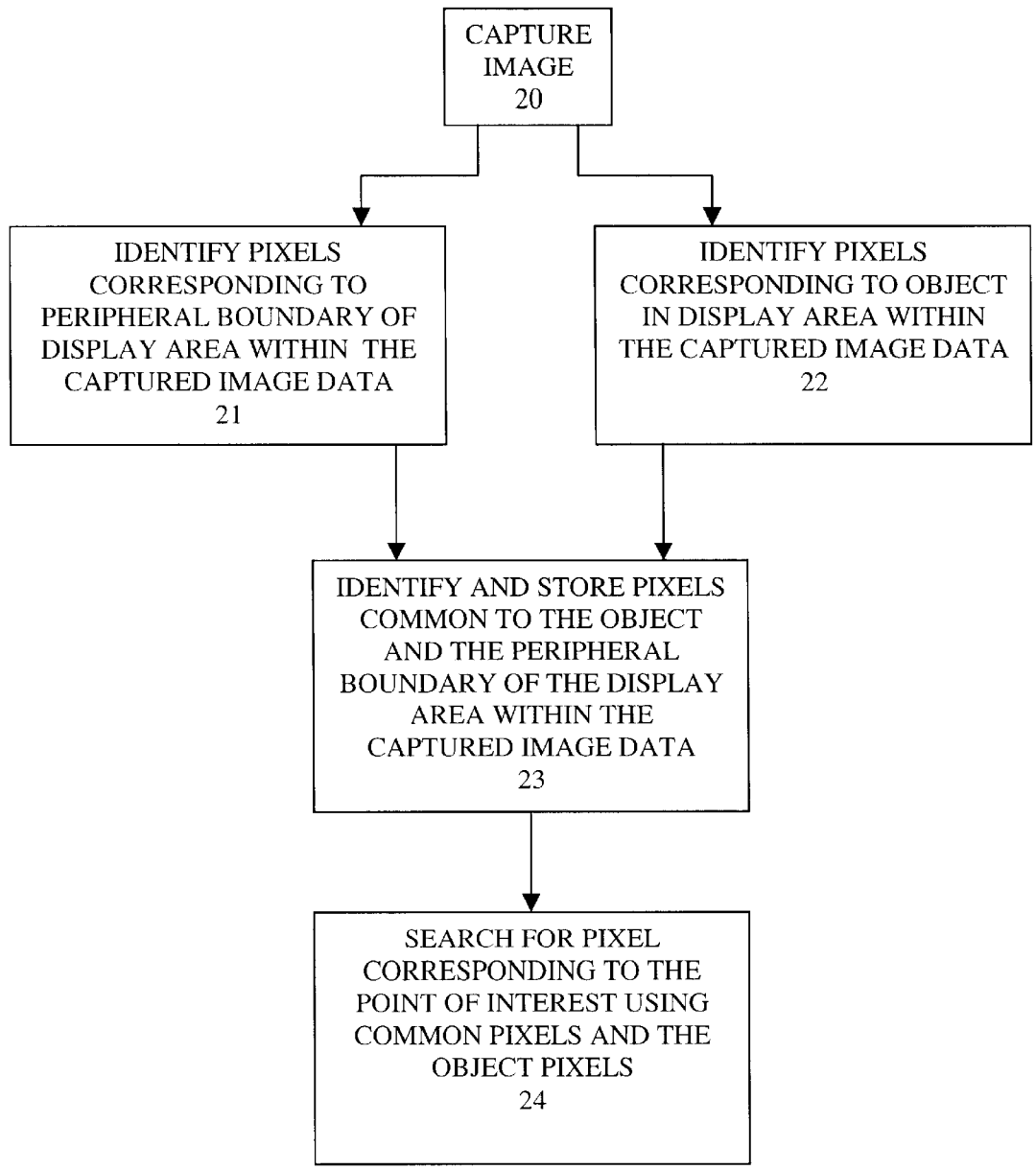
FIG. 2 illustrates a first embodiment of the method of identifying a point of interest of an object located in front of a computer controlled display area captured by an image capture device in accordance with the present invention.
Figure 3:
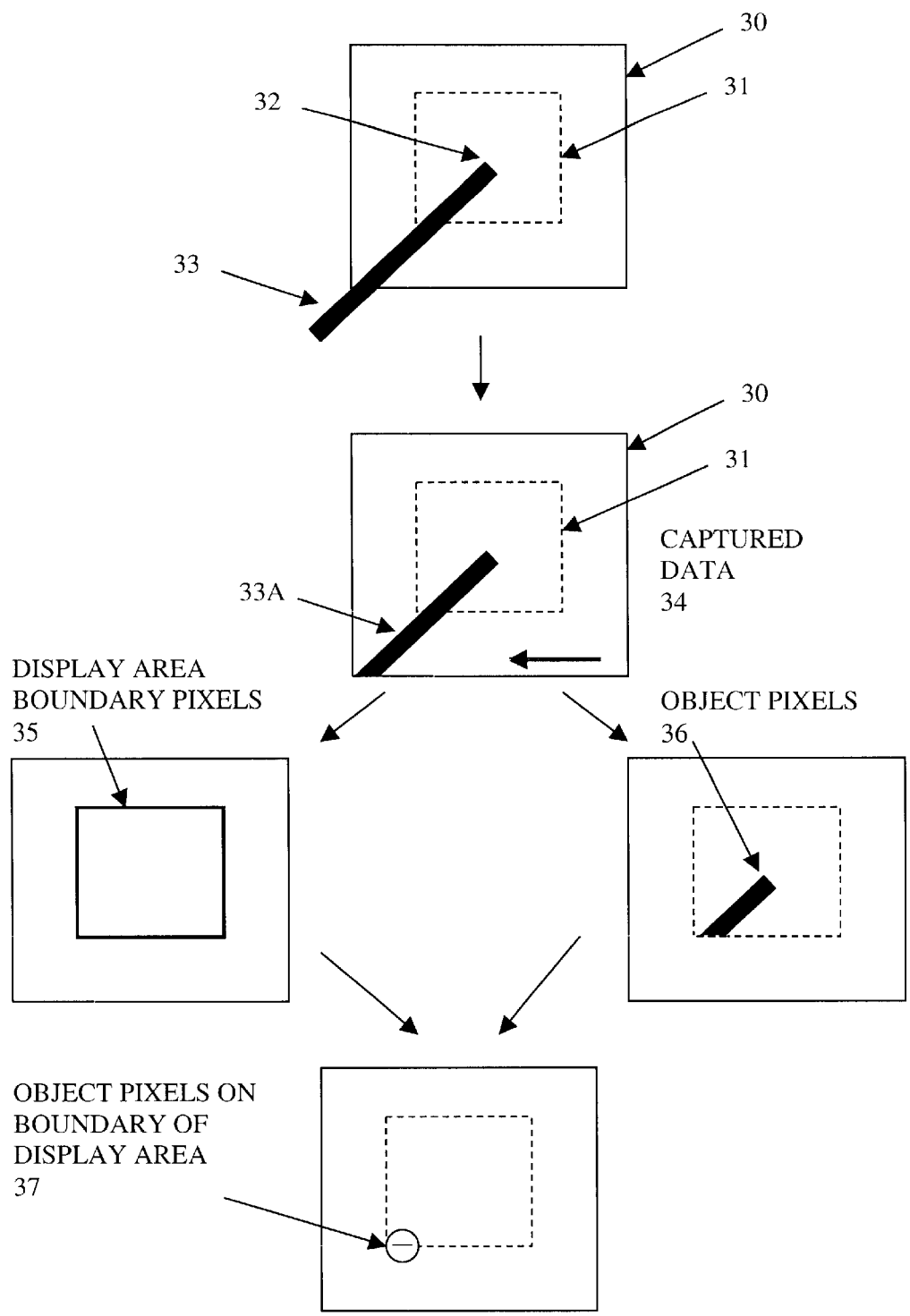
FIG. 3 illustrates identifying pixels in accordance with the system and method of the present invention.

FIG. 2 shows an embodiment of the method for identifying the point of interest of an object located in the foreground of a display area captured by an image capture device and FIG. 3 illustrates images relating to the process shown in FIG. 2. Referring to FIG. 3, a capture area 30 includes a display area 31. The display area 31 includes an image that is displayed according to the image data 10A generated by the computing system 10. Extending into the capture area and into the display area is an object 33 having a point of interest 32. Initially, an image is captured (block 20). FIG. 3 shows the captured image data 34 that includes data corresponding to the image being displayed in the display area 31, the portion of the object 33A extending into the capture area 30, and regions outside of the display area but within the capture area.

Subsets of pixels within the captured image data are then identified that correspond to each of the peripheral boundary of the display area (block 21) and the object in the foreground of the display area (block 22). FIG. 3 shows the subset of object pixels 36 and the subset of boundary pixels 35. The subset of pixels (37, FIG. 3) common to both the object and peripheral boundary pixel value subsets are then determined and are stored in a FIFO (block 23). The subset of common pixels and the subset of object pixels are then used to search the object pixels to find the point of interest of the object in the foreground of the display (block 24).

Figure 4:
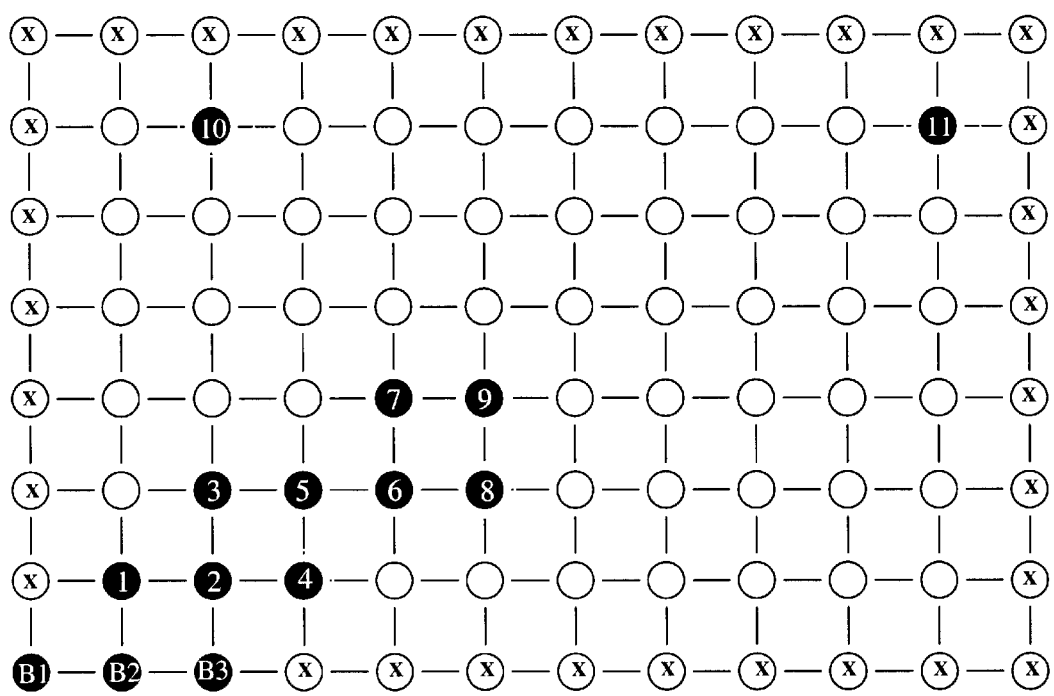
FIG. 4 shows an array of pixels representing the captured display area including the peripheral boundary of the display area and the object within the display area.
Figure 5:
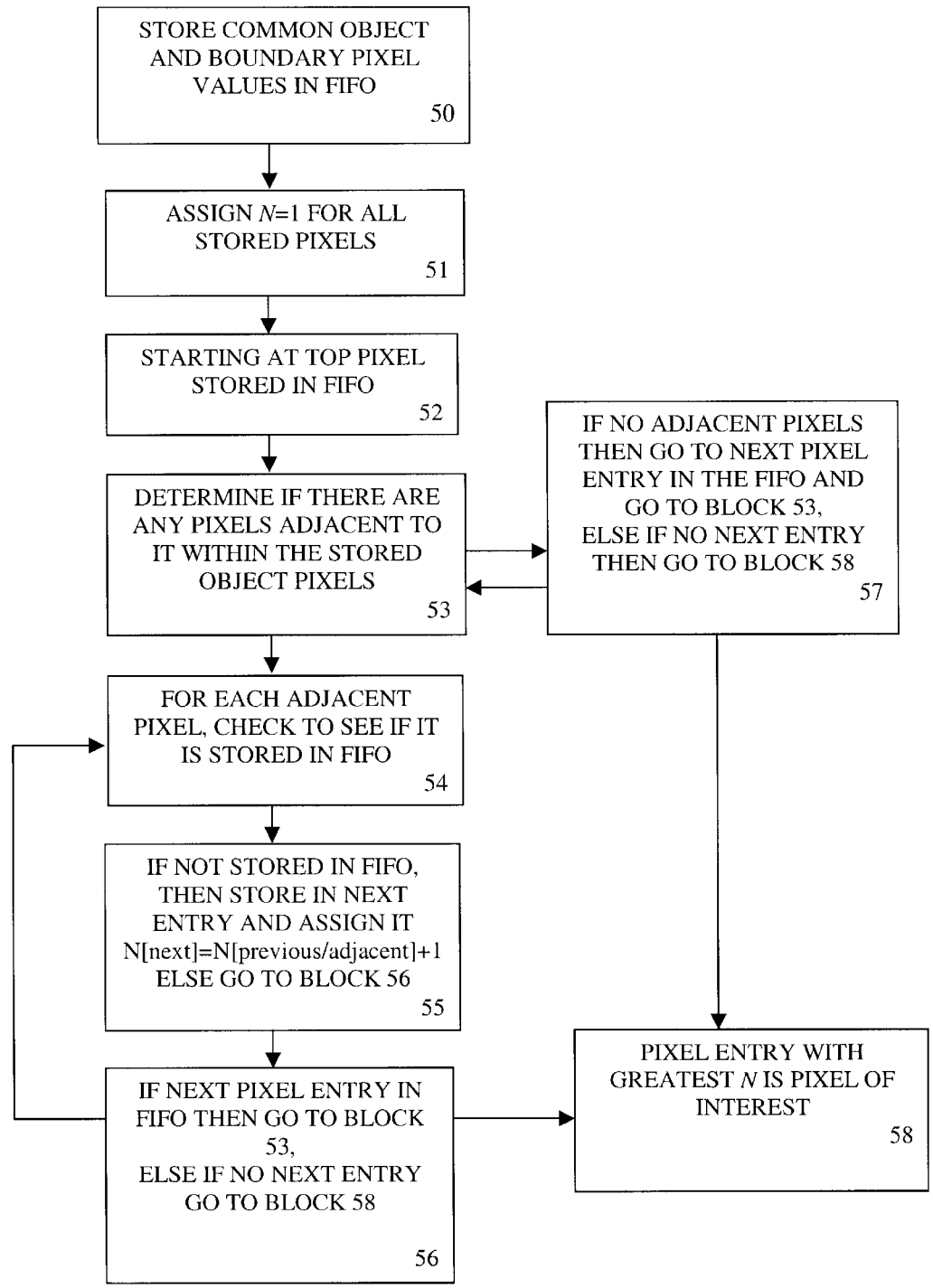
FIG. 5 illustrates a flow diagram for performing a breadth-first search on the pixels shown in FIG. 4.

According to one embodiment of the system and method of the present invention, the common pixels and the subset of object pixels are searched using a breadth-first search algorithm which can be implemented in one of software, hardware, or a combination of software and hardware. A breadth-first search algorithm is a well known algorithm used for searching a graph. FIG. 4 shows an example of applying a breadth-first search algorithm to an array of pixels corresponding to a captured display area. The array includes pixels corresponding to an object in the foreground of the display area (i.e., B1, B2, B3, 1–9) and pixels corresponding to the peripheral boundary of the display area (pixels marked with an x, B1, B2, B3). FIG. 5 shows the process for performing a breadth-first search on the pixels shown in FIG. 4, and FIG. 6 shows an exemplary FIFO corresponding to the array shown in FIG. 4 created when performing the method shown in FIG. 5.

Initially, common object and peripheral boundary pixels (i.e., B1, B2, B3) are stored in a FIFO (block 50). Each pixel stored in the FIFO is assigned an indicator N=1 (block 51) where N corresponds to a distance indicator of the pixel to the peripheral boundary of the display area. Hence, the first, second, and third entries in the FIFO (FIG. 6), B1, B2, and B3 are assigned N=1. It should be noted that pixels 10 and 11 correspond to noise that erroneously appear as object pixels in the array shown in FIG. 4. However, since these pixels are not boundary pixels and are not adjacent in the vertical or horizontal direction to any boundary pixels, they are not stored in the FIFO and have no impact on the process shown in FIG. 5.

Starting at the first pixel entry in the FIFO (block 52), B1, determine if there are any other object pixels adjacent to it (block 53) where an adjacent pixel is defined as a pixel that is immediately adjacent in the vertical or horizontal direction to the pixel entry of interest. As can be seen in FIG. 4, the only adjacent pixel to B1 is B2. Each adjacent pixel is checked to determine if it is already stored in the FIFO (block 54). Since B2 is already stored in the FIFO, the next pixel entry is processed (blocks 55 and 56). The process as described in blocks 53–55 is performed on the second FIFO entry, B2. As can be seen in FIG. 4, B1, B3, and pixel 1 are adjacent to pixel B2. Next, for each pixel (ap) adjacent to the pixel entry of interest (p) that is not stored in the FIFO, store in the FIFO and assign $N_{(ap)}=N_{(p)}+1$ (blocks 53–55). Since pixel 1 is the only adjacent pixel not stored in the FIFO, it is stored and assigned $N_{pixel\ 1}=N_{B2}+1=1+1=2$. In the case in which a given pixel stored in the FIFO does not have any adjacent pixels, then go to the next pixel entry (block 57). Continuing processing the remainder of the object pixels as indicated in FIG. 5 while creating the FIFO shown in FIG. 6:

third entry, B3, is adjacent to B2 and pixel 2. Pixel B2 is already stored in the FIFO, pixel 2 is stored in the FIFO and assigned $N_{pixel\ 2}=N_{B3}+1=1+1=2$;

fourth entry, pixel 1, is adjacent to B2 and pixel 2. Both are already stored in the FIFO, go to next entry;

fifth entry, pixel 2, is adjacent to B3, pixel 1, 3, and 4. Pixels B3 and 1 are already stored so Pixels 3 and 4 are stored in the FIFO and are each assigned $N_{pixel\ 3}=N_{pixel\ 3}=N_{pixel\ 2}+1=2+1=3$;

sixth entry, pixel 3, is adjacent to pixels 2 and 5. Pixel 2 is already stored so Pixel 5 is stored in the FIFO and assigned $N_{pixel\ 5}=N_{pixel\ 3}+1=3+1=4$;

seventh entry, pixel 4, is adjacent to pixels 2 and 5. Both of Pixels 2 and 5 are already stored so go to next entry;

eighth entry, pixel 5, is adjacent to pixels 3, 4, and 6. Both of Pixels 3 and 4 are already stored so Pixel 6 is stored in the FIFO and assigned $N_{pixel\ 6}=N_{pixel\ 5}+1=4+1=5$;

ninth entry, pixel 6, is adjacent to pixels 5, 7, and 8. Pixel 5 is already stored so Pixels 7 and 8 are stored in the FIFO and assigned $N_{pixel\ 7}=N_{pixel\ 8}=N_{pixel\ 6}+1=5+1=6$;

tenth entry, pixel 7, is adjacent to pixels 6 and 9. Pixel 6 is already stored so Pixels 9 is stored in the FIFO and assigned $N_{pixel\ 9}=N_{pixel\ 7}+1=6+1=7$;

eleventh entry, pixel 8, is adjacent to pixels 6 and 9. Pixels 6 and 9 are already stored so go to next pixel; and twelfth entry, pixel 9, is adjacent to pixels 7 and 8. Pixels 7 and 8 are already stored and there are no more pixel entries.

The pixel with the greatest N, (i.e., pixel 9) is the pixel corresponding to the point of interest (block 58).

It should be understood that the breadth-first search algorithm is a simple version of dynamic programming search algorithms and that other search algorithms for locating the point of interest of an object as defined may be used such as other dynamic programming search algorithms with variations in definitions of pixel adjacency and pixel distance.

It should also be noted that in accordance with the system and method shown in FIGS. 1–6, the movement and location of non-static objects positioned in front of the displayed image are constantly being determined. Hence, whereas the subset of the pixels corresponding to the peripheral boundary of the display screen is determined once, the subset of pixels corresponding to the object is determined on a continual basis so as to detect the movement and location of the object during a real-time presentation. For instance, image capture device 13 can be capturing the display area on a continual basis and the image data corresponding to each new captured image is used to locate the subset of object pixels (FIG. 2, block 22) at the different time intervals. Consequently, a point of interest of the object pixels at each time interval can be determined. Since the breadth-first searching algorithm is a computationally simple search technique, point of interest determination can be performed on a real-time basis.

Hence, a simplified, real-time system and method is described for finding the point of interest of an object in the foreground of a display area captured by an image captured device.

In the preceding description, numerous specific details are set forth in order to provide a thorough understanding of the present invention. It will be apparent, however, to one skilled in the art that these specific details need not be employed to practice the present invention. In other instances, well-known imaging techniques have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method of identifying a point of interest of an object located in front of a computer controlled display area captured by an image capture device comprising:
   capturing an image of the display area to obtain captured data comprising an array of pixels;
   identifying pixels corresponding to the object within the captured data;
   identifying pixels corresponding to a peripheral boundary of the display area within the captured data;
   identifying and storing a subset of pixels common to the object pixels and the peripheral boundary pixels;
   searching using the common pixels and the object pixels to identify a pixel corresponding to the point of interest.

2. The method as described in claim 1 wherein searching is performed using breadth-first searching.

3. The method as described in claim 1 wherein searching is performed using dynamic programming search algorithms.

4. The method as described in claim 1 further comprising capturing a plurality of images in a real-time image presentation so as to locate the point of interest of the object in front of the display area within each captured image.

5. The method as described in claim 1 further comprising providing the location of the point of interest pixel to the computer for controlling the display area.

6. The method as described in claim 1 wherein the display area is a projection screen.

7. The method as described in claim 1 wherein the image capture device is one of a digital still camera, a digital video camera, an analog still camera, and an analog video camera.

8. A system of identifying a point of interest of an object located in front of a computer controlled display comprising:
   an image capture device for capturing an image of the display area within the capture area to obtain captured data including an array of pixels;
   means for identifying pixels within the captured data corresponding to the object;
   means for identifying pixels within the captured data corresponding to a peripheral boundary of the display area;
   means for identifying and storing the subset of pixels common to the object pixels and the boundary pixels;
   means for searching using the common pixels and the object pixels to identify a pixel corresponding to the point of interest.

9. The system as described in claim 8 wherein the means for searching is a breadth-first search algorithm.

10. The system as described in claim 8 wherein the means for searching is a dynamic programming search algorithm.

11. The system as described in claim 8 wherein the means for identifying object pixels, means for identifying boundary pixels, means for identifying and storing the common subset of pixels, and the search algorithm are implemented by one of software algorithm, hardware, and a combination of a software algorithm and hardware.

12. The system as described in claim 8 wherein the means for identifying object pixels, means for identifying boundary pixels, means for identifying and storing the common subset of pixels, and the search algorithm are implemented within the computer system.

13. The system as described in claim 8 wherein any portion of the means for identifying object pixels, means for identifying boundary pixels, means for identifying and storing the common subset of pixels, and the search algorithm are implemented external to the computer system.

14. The system as described in claim 8 wherein the display area is a projection screen.

15. The system as described in claim 8 wherein the image capture device is one of a digital still camera, a digital video camera, an analog still camera, and an analog video camera.

16. An apparatus for identifying a point of interest of an object located in the foreground of a computer controlled display area, wherein the display area is captured at least once by an image capture device to obtain captured data, the apparatus comprising:
   a first pixel identifier for identifying pixels within the captured data corresponding to the object in the foreground of the display area;
   a second pixel identifier for identifying pixels within the captured data corresponding to a peripheral boundary of the display area;
   a third pixel identifier for identifying a subset of pixels common to the object pixels and the peripheral boundary pixels;
   a storage area for storing the common subset of pixels;
   a searching algorithm for searching using the common pixels and the object pixels to identify a pixel corresponding to the point of interest.

17. The apparatus as described in claim 16 wherein the searching algorithm is a breadth-first search algorithm.

18. The apparatus as described in claim 16 wherein the means for searching is a dynamic programming search algorithm.

19. The apparatus as described in claim 18 wherein the first, second, and third pixel identifier and the dynamic programming search algorithm are implemented by one of software algorithm, hardware, and a combination of a software algorithm and hardware.

20. The apparatus as described in claim 18 wherein first, second, and third pixel identifier and the dynamic programming search algorithm are implemented within a computer system.

21. The apparatus as described in claim 17 wherein the display area is a projection screen.

22. The apparatus as described in claim 17 wherein the image capture device is one of a digital still camera, a digital video camera, an analog still camera, and an analog video camera.

* * * * *